July 16, 1940.     H. L. BARTHELEMY     2,207,774
GAS CONDITIONING
Filed Dec. 7, 1938
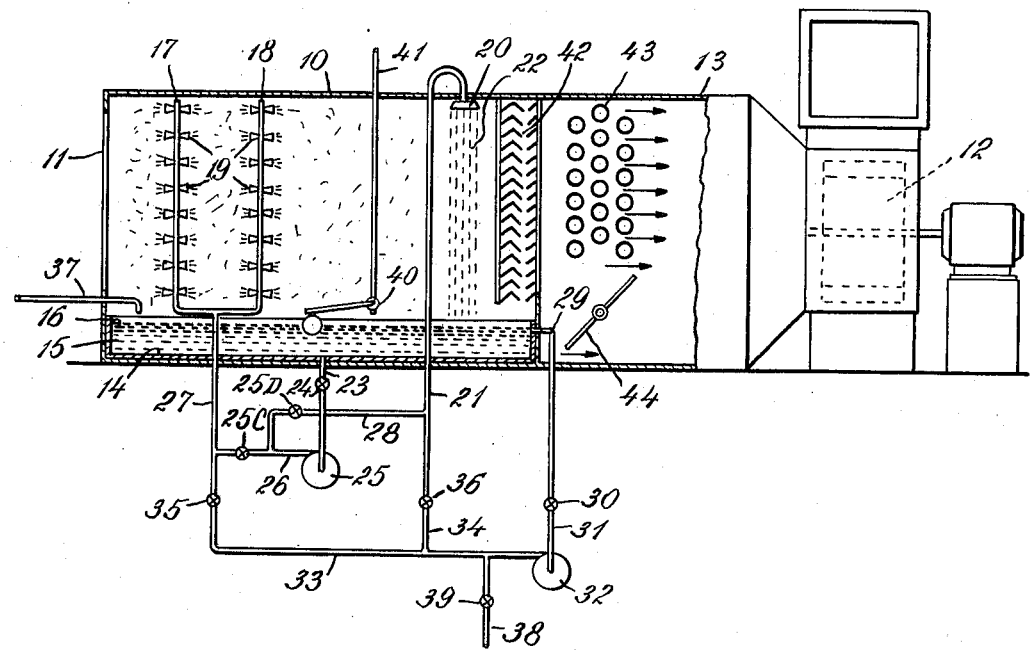
INVENTOR
Henri Louis Barthelemy
BY Pennie, Davis, Marvin & Edmonds
ATTORNEYS Patented July 16, 1940

2,207,774

UNITED STATES PATENT OFFICE 2,207,774

GAS CONDITIONING

Henri Louis Barthelemy, Rome, Ga., assignor to Tubize Chatillon Corporation, New York, N. Y., a corporation of Delaware Application December 7, 1938, Serial No. 244,309

11 Claims. (Cl. 183—121)

This invention relates to the removal of suspended solids from gases, is concerned particularly with air-conditioning and the like, and contemplates an improved method for removing water-repellent solids from such gases.

In air-conditioning and the like, provided that temperature and humidity conditions are appropriate, gases containing suspended solids may be scrubbed with water sprays which tend to remove suspended solids. However, certain solids are difficult to remove from gases with water sprays because they do not become wetted and hence are not entrained by the water. It has been proposed heretofore to incorporate wetting agents in the spray water in order to improve the scrubbing efficiency, but in order to obtain maximum utilization of the water and any wetting agents included therein, it is desirable to circulate the water through the spray system. Because the sprays usually have small orifices, circulation of the water requires that solids collected therein be removed prior to the re-introduction of the water to the sprays. Moreover, circulation of dirty spray water involves some danger of re-introducing the solids into the gas from which they have been removed.

Removal of the solids from the water may be accomplished by settlement or filtration, but both of these systems require extensive equipment for which frequently there is insufficient space. Moreover, (especially with spray water recovered from air-conditioning equipment in use in textile plants) filters and the like become clogged rapidly with lint.

Provided that the desired humidity of the conditioned gas is such as to tolerate water scrubbing, and provided that foaming due to the inclusion of a wetting agent in the water is not too excessive, the cleaning of air and other gases with a water spray including a wetting agent is effective. There are, however, many cases in which water scrubbing may not be employed because of its tendency to increase the humidity of the gases treated. There is, therefore, a need for a system of gas-conditioning that will remove water-repellent solids from gases without increasing the humidity thereof to an objectionable extent and does not involve difficulties of filtration.

As a result of my investigations, I have discovered improvements in methods of and apparatus for gas scrubbing whereby the aforementioned difficulties are avoided and solids, particularly difficultly wettable solids, are removed from the gas simply and with a minimum of equipment. I have discovered that solids suspended in gases (and particularly the water-repellent solids such as soot and certain micro-organisms and spores) have a high affinity for oil, so that they may be scrubbed out of the gas by means of an oil spray or, when water scrubbing may be tolerated, scrubbed out of the gas by means of water containing a wetting agent and subsequently removed from the water by bringing the latter into contact with a body of oil.

This body of oil preferably is maintained in the bottom of the spray chamber floating above a layer of water. The water spray containing the solids it has picked up from gases passing through the chamber, falls on and passes through the oil body and in so doing gives up a large proportion of its solids to the oil. The clean water may then be recirculated through the spray without danger of blocking the spray orifices. After the oil has been contaminated with solids to the point where it becomes excessively viscous and is no longer suitable for collecting solids, it may be decanted or otherwise removed and replaced with fresh oil.

When the condition of the air or other gas is such that water scrubbing may not be tolerated because of the increased humidity which this would bring about, the oil may be circulated through the sprays in the chamber and will act directly to scrub the solids from the gas.

The process of my invention is particularly advantageous in that it may be employed in existing spray chambers with inexpensive structural changes. Such chambers ordinarily are built above a tank or tray into which the spray falls, and it is only necessary to place a layer of oil over the pool of water maintained in the tray in order to have an effective means for removing solids from the spray water. If, in addition, a conduit is connected to the tray at the level of the oil layer and also connected to the inlet of a circulating means, such as a pump, the oil may be sprayed through the chamber in place of the water at times when water scrubbing may not be tolerated.

In accordance with my invention, froth in the spray chamber may be prevented by incorporating in the circuit an anti-frothing agent, preferably one that is soluble in the oil and substantially insoluble in the water. In this way, the formation of froth in the spray chamber above the bath of oil is inhibited but the anti-frothing agent is maintained at only one point in the circuit and does not circulate substantially with the water.

As indicated hereinbefore, the oil employed is preferably of a specific gravity such that it floats on the water bath in the tray at the bottom of the spray chamber. Almost any relatively non-viscous oil which is substantially immiscible with water may be employed, and oils of mineral, animal and vegetable origin are suitable for the practice of my invention. The transfer of solids from the water to the oil is, however, facilitated if the water is brought into intimate contact with the oil by agitation or otherwise. Ordinarily, the water spray will fall upon the oil bath with sufficient violence to secure adequate admixture, but if this is not the case, the oil and water may be subjected to agitation either within or outside the spray chamber.

The inclusion of the wetting agent in the water aids in the transfer of the solids from the water to the oil, by promoting the formation of an emulsified layer at the interface between the oil and the water.

These and other features of my invention will be more thoroughly understood in the light of the following detailed description taken in conjunction with the accompanying single figure which is a schematic elevation, partly in section, of an air scrubbing apparatus equipped for a preferred practice of my invention.

Referring now to the figure, air or other gas contaminated with suspended solid particles (for example, air from a textile plant, from which it is desired to remove micro-organisms, spores, soot and lint, in order to prevent the contamination of textiles) is drawn into a spray chamber 10 through an inlet 11 by means of a fan 12 connected to a gas outlet conduit 13 at the opposite end of the spray chamber.

In the bottom of the spray chamber is a horizontally disposed tray 14 adapted to retain a pool of water 15 overlain by an oil layer 16. A series of vertical spray pipes 17, 18, provided with a multiplicity of spray nozzles 19 is disposed within the chamber above the tray and, near the outlet of the chamber is a curtain shower head 20 fed by a pipe 21 which discharges a downwardly directing shower 22 that serves both to scrub the air and to break any froth which may tend to form on the oil layer in the tray. Water falling into the tray from the spray chamber passes through the oil layer (where it gives up its solids) into the water pool, from whence it is withdrawn through a bottom outlet 23, provided with a valve 24, into the suction side of a centrifugal water pump 25 which serves to return the water through pipes 26, 27, 28, to the sprays or the curtain shower head, or both. Valves 25C, 25D are provided for cutting off the discharge of the pump to the sprays or the shower head, or both. At the normal level of the oil layer in the tray there is an outlet 29 provided with a valve 30, which is connected by a pipe 31 to the suction side of a centrifugal oil pump 32. In the event that oil circulation is required instead of water circulation, the valve on the water outlet from the tank is closed and that on the oil outlet is open whereupon the pump circulates oil to the sprays or the curtain shower head, or both, through pipe lines 33, 34, connected respectively to the sprays and the shower head. Valves 35, 36, are disposed respectively in the lines 33, 34, for interrupting discharge of oil to the sprays or shower head, or both.

The tray is provided with an oil inlet line 37 which overlies it and an oil bleeder line 38 communicating with the outlet of the oil pump and equipped with a valve 39, is provided for decanting contaminated oil.

A float controlled valve 40 connecting to a water feed line 41 is provided for making up water lost by evaporation and for maintaining substantially constant the level of the water in the tray.

Suspended at the outlet end of the spray chamber following the curtain shower is a baffled chamber 42 of conventional design for stopping the spray and removing it from the gas stream. The baffled chamber also overlies the tray and water or oil stopped by the baffles drains into the tray.

Following the baffles in the path of the gases to the fan is a conventional temperature regulation coil 43 which supplies or extracts heat from the gases. A dampered by-pass 44 for diverting the gas around the cooling coil is disposed below the coil.

If desired, separate sprays may be provided for the water and the oil, the separate spray systems being fed by the respective pumps.

As indicated hereinbefore, certain solid particles which contaminate air and the like are water-repellent, this characteristic being manifested particularly by soot and certain micro-organisms and spores which are coated with a water-repellent substance that enables them to remain suspended in the atmosphere even during heavy rains. Hence, in the practice of my invention, I prefer to include a wetting agent in the spray water. There are many such agents, among them being mahogany sodium sulphonate, sulphonated fatty alcohols, sulphonated oils, and soaps. Moreover, almost any electrolyte tends to reduce the surface tension of water and thus aids in the wetting of the water-repellent particles.

The inclusion of a wetting agent in the spray chamber brings about a thorough wetting of the particles to be removed and leads to their collection in the water, but at the same time, the wetting agents tend to promote objectionable foaming. The curtain shower falling on the bath is in some instances sufficient to suppress the foaming but in other cases it is desirable to employ an anti-frothing agent. Such an agent, for example, tri-butyl citrate, tends to counteract the foaming tendency and prevent suds from being formed within the spray chamber and carried out of the chamber by the gas current. I have found that the anti-frothing agent need not be one which is soluble in the water. In fact, anti-frothing agents which are substantially insoluble in water and at least slightly soluble in the oil may be employed advantageously. Among such agents are certain water-insoluble, oil-soluble soaps of heavy metals (for example, lime and aluminum soaps of fatty acids or resin acids). Also, tri-butyl citrate, alcohols such as octanol, octadecanol, the secondary and tertiary alcohols, regular constituents of pine-oil, which compounds are relatively insoluble in water and substantially soluble in certain oils, may be employed with advantage. The use of such anti-frothing agents is advantageous in that they remain in the oil layer and are not subjected to circulation and consequent opportunity for loss.

To take a specific example of my invention as practiced with the apparatus illustrated, the spray water is made up by dissolving 5 kilograms of sodium mahogany sulphonate in 3000 liters of water.

An oil bath having the following composition is also prepared:

| | Kilograms |
|---|---|
| Mineral oil, specific gravity 0.85, flash point 190° C., Saybolt viscosity at 37.8° C.—95° sec. | 20 |
| Sodium mahogany sulphonate | 1 |
| Oleyl alcohol | 1 |
| Octyl alcohol | 0.25 |

The water is placed in the tray and the oil layer is run in so that it floats on top of the water.

In the normal operation of the apparatus, the water containing the wetting agent is circulated through the sprays in the spray chamber and falls on the oil. About 70,000 cubic feet per minute of contaminated air containing considerable quantities of soot, spores, textile lint and atmospheric dust are passed through the spray chamber at a velocity of about 625 feet per minute. The water wets out the solids from the air and carries them to the oil. In penetrating through the oil layer, the water gives up its solid contents to the oil. After the oil has accumulated a quantity of solids such that it becomes too heavy and viscous, the oil is withdrawn and replaced by fresh oil.

The use of the water spray is applicable only where the temperature of the water and the temperature and humidity of the gas to be treated have such a relation that the wet bulb temperature of the air is below the temperature of the sprayed water.

In certain instances where the water spray cannot be used, the oil bath is circulated through the sprays or through both the sprays and the shower after an appropriate valve adjustment. In textile plants during the winter season and also in the summer season in certain southern localities, the air admitted to the spray chamber at, for example, a temperature of 85° F. and 63% of water saturation will tend to increase the temperature of the water in the spray system to a point that is higher than the corresponding wet bulb temperature (75° F.). There will thus be some cooling but the cooling will be accompanied by an undesirable and rapid increase in the relative humidity of the conditioned air. In such a case, the oil instead of the water may be circulated through the spray chamber and in this way the solids are picked up directly by the oil.

In certain instances, it may be desirable to circulate an oil through the sprays and water through the shower. This may be done by running both pumps with valves 30, 35, 24 and 25D open, the other valves being closed.

As indicated hereinbefore, the wetting agent included in the water serves two purposes, in that it aids in removing solids from the gases and also aids in the transfer of the solids from the water to the oil. When substantially none of the solids to be removed from the gas are water-repellent, the wetting agent may be omitted. However, the use of the wetting agent generally is to be preferred because even when solids are not water-repellent, their transfer from the water to the oil is aided by the wetting agent.

The thickness of the oil layer in the tray need not be very great. An oil layer having a thickness of one inch or less is adequate for collecting the solids from the water spray. However, if provision is made for the circulation of the oil, there should be a layer of sufficient depth and volume to serve as an adequate supply for the pump.

The viscosity of oil to employ will depend upon whether or not it is to be circulated. If circulation of the oil is contemplated, it should have a viscosity of 100 sec. Saybolt or less at the temperature of use. If circulation is not contemplated, the oil may be more viscous, say up to 1000 sec. Saybolt at the temperature of use. Generally speaking, when the oil attains a viscosity of 3000 sec. Saybolt (at the temperature of use) due to the inclusion of solids therein, it will be advisable to discard it.

If desired, the oil may be brought into contact with the water outside of the spray chamber, in which case it is advantageous to mix the water with the oil in an agitator and thereafter allow the two to become quiescent so that the oil separates from and may be removed from the water by decantation. Pneumatic or mechanical agitation may be employed.

The proportions of wetting agents and anti-frothing agents to employ will depend upon the character of the solids to be removed. Generally speaking, however, the wetting agent should have a concentration of from 0.25 gram per liter to 10 grams per liter of water, and the anti-frothing agent should be present in proportions ranging from 0 gram per liter to 100 grams per liter of oil.

The removal of micro-organisms in the process of my invention is very thorough. During the treatment of 70,000 cubic feet per minute of air from a textile plant, the air velocity in the spray chamber was 625 ft. per minute. Petrie dishes containing solid nutrient broth were exposed for 5 minutes respectively at the outlet and the inlet of the spray chamber, and then incubated at 37° C. for 24 hours. The inlet samples showed an average of 800 to 3000 germs per plate, but at the outlet the samples showed only 2 to 5 germs per plate.

I claim:

1. In the removal of water-repellent solids from suspension in gas, the improvement which comprises passing a fine spray of water containing a wetting agent through the gas onto a body of oil, directing a relatively coarse spray of water onto said oil to inhibit foaming, passing the water through the body in intimate contact therewith, and returning the water to the sprays.

2. In the removal of solids from suspension in gas, the improvement which comprises scrubbing the suspension with water containing a wetting agent capable of increasing the wettability of the solids by the water, wetting the surfaces of the solids with the water and collecting them in the water, thereafter bringing the water containing the solids into contact with a liquid oleaginous body that is substantially immiscible with the water, collecting the solids in the body and separating the water from the body in which the solids have been collected.

3. In the removal of water-repellent solids from suspension in gas, the improvement which comprises spraying water containing a wetting agent for the solids through said suspension onto a pool of oleaginous liquid that is substantially immiscible with the water and thus wetting the solids and collecting them in the water spray and transporting them to the body, passing the water through the body of oil and thereby transferring the solids from the water to the oil and separating the water from the oil containing the solids.

4. In the removal of water-repellent solids from suspension in gas, the improvement which comprises spraying through the suspension water containing a wetting agent for the solids and thus wetting the solids and collecting them in the water, bringing the water containing the solids onto a pool of oil that is substantially immiscible with water and has a lower specific gravity, passing the water through the pool, thus transferring the solids from the water to the oil, and returning the water to the spray.

5. In the removal of water-repellent solids from suspension in gas, the improvement which comprises spraying water containing a wetting agent through the suspension, thus wetting the solids and collecting them in the water, bringing the water containing the solids into intimate contact with a body of oil, said body being relatively non-viscous and immiscible with water and containing an anti-frothing agent, and separating the water from the body of oil while leaving the solids therein.

6. Process according to claim 5 in which the oleaginous body contains an anti-frothing agent which is relatively insoluble in the water.

7. Process according to claim 5 in which the spray of water passing through the suspension falls on the body of oil and passes downwardly therethrough.

8. In the removal of water-repellent solids from a suspension in gas, the improvement which comprises spraying water containing a wetting agent for the solids through the suspension, thereafter bringing the resulting mixture of water and solids into intimate contact with a liquid relatively non-viscous body of oil thus transferring the solids collected in the water to the oil and separating the water from the oil.

9. Process according to claim 8 in which the wetting agent is selected from the group consisting of sulfonated fatty alcohols, sulfonated oils, soaps and electrolytes that reduce the surface tension of water.

10. Process according to claim 8 in which an anti-frothing agent is incorporated in the oil, said anti-frothing agent being selected from the group consisting of water-insoluble oil-soluble soaps of heavy metals, tributyl citrate and water-insoluble oil-soluble alcohols.

11. In the removal of solids from suspension in gas, the improvement which comprises scrubbing the suspension with water containing a wetting agent capable of increasing the wettability of the solids by the water, the wet bulb temperature of the gas being below that of the water, bringing the resulting mixture of water and solids into intimate contact with a body of oil, separating the water from the oil in which the solids have been collected, and scrubbing the suspension with the oil when the wet bulb temperature of the gas is above the temperature of the water.

HENRI LOUIS BARTHELEMY.